(12) United States Patent
Nakahara et al.

(10) Patent No.: US 8,133,604 B1
(45) Date of Patent: Mar. 13, 2012

(54) ELECTROCHEMICAL DEVICE ASSEMBLY HAVING ELECTRODE TABS CONNECTED TO A CLAD SPACER

(76) Inventors: Hiroshi Nakahara, Santa Clarita, CA (US); Sang Young Yoon, Saugus, CA (US)

( * ) Notice: Subject to any disclaimer, the term of this patent is extended or adjusted under 35 U.S.C. 154(b) by 1696 days.

(21) Appl. No.: 11/398,246

(22) Filed: Apr. 5, 2006

(51) Int. Cl.
*H01M 6/00* (2006.01)

(52) U.S. Cl. ........................................ 429/122; 429/123

(58) Field of Classification Search .................... 429/122
See application file for complete search history.

(56) References Cited

U.S. PATENT DOCUMENTS

| | | | |
|---|---|---|---|
| 6,555,265 B1 * | 4/2003 | Fleming et al. | 429/160 |
| 6,599,659 B1 * | 7/2003 | Endo et al. | 429/127 |
| 2004/0038124 A1 * | 2/2004 | Hisamitsu et al. | 429/161 |
| 2004/0197642 A1 * | 10/2004 | Sato | 429/158 |
| 2004/0224227 A1 * | 11/2004 | Ozawa et al. | 429/211 |

\* cited by examiner

*Primary Examiner* — Ula C Ruddock
*Assistant Examiner* — Jacob Marks
(74) *Attorney, Agent, or Firm* — Gowrilonch Dodd & Lindsey LLP (57) ABSTRACT

The electrochemical device assembly includes an anode tab in electrical communication with one or more anodes. The anode tab includes a first material. The assembly also includes a spacer having a third material and a fourth material. The third material is connected to the first material of the anode tab. The assembly also includes a cathode tab in electrical communication with one or more cathodes. The cathode tab includes a second material connected to the fourth material of the spacer. The second material is different from the first material and the fourth material is different from the third material.

4 Claims, 7 Drawing Sheets

ELECTROCHEMICAL DEVICE ASSEMBLY HAVING ELECTRODE TABS CONNECTED TO A CLAD SPACER

STATEMENT REGARDING FEDERALLY SPONSORED RESEARCH OR DEVELOPMENT

This invention was made with United States Government support under contract W15P7-05-C-P212 awarded by the U.S. Army Communications-Electronic Research & Engineering Center. The United States Government has certain rights in this invention.

FIELD

The present invention relates to electrochemical devices, and more particularly to connection of electrodes in electrochemical devices.

BACKGROUND

A variety of batteries employ one or more electrodes that each have a tab extending from a substrate. The tabs from different electrodes must often be connected to one another. Because tabs of anodes are often constructed of different materials than the tabs of cathodes, connecting the tabs from different electrodes often requires that tabs constructed of different materials be welded together. However, the difference in the melting points of different materials can make the welding process difficult and can result in a weak connection between the tabs. As a result, there is a need for an improved connection between the tabs of different batteries.

SUMMARY

An electrochemical device assembly includes an anode tab in electrical communication with one or more anodes. The anode tab includes a first material. The assembly also includes a spacer having a third material and a fourth material. The third material is connected to the first material of the anode tab. The assembly also includes a cathode tab in electrical communication with one or more cathodes. The cathode tab includes a second material connected to the fourth material of the spacer. The second material is different from the first material and the fourth material is different from the third material. The third material can be clad directly on the fourth material or the fourth material can be clad directly on the third material. Alternately, the third material and/or the fourth material can be clad on a substrate.

A method of generating an electrochemical device includes connecting a first material on an anode tab to a third material on a spacer. The method also includes connecting a second material on a cathode tab to a fourth material on the spacer. The anode tab is configured to be in electrical communication with one or more anodes and the cathode tab is configured to be in electrical communication with one or more cathodes. The second material is different from the first material and the fourth material is different from the third material.

The method can also include causing the spacer to be generated by cladding the third material on the fourth material and/or by cladding the fourth material on the third material. In some instances, the method includes causing the spacer to be generated by cladding the third material on a substrate and/or by cladding the fourth material on the substrate.

In some instances, a first weld is performed so as to connect the first material to the third material and a second weld is performed so as to connect the second material to the fourth material. The first weld can be a different type of weld than the second weld. In one example, the first weld is a resistance weld and the second weld is an ultrasonic weld.

In some instances, the first material has a melting point that is within the melting point of the third material plus or minus 10% and/or the second material can have a melting point that is within the melting point of the fourth material plus or minus 10%. In some instances, the first material and the third material are the same material and the second material and the fourth material are the same material. In one example, the first material and the third material are nickel and the second material and the fourth material are aluminum.

BRIEF DESCRIPTION OF THE FIGURES

FIG. 1A through FIG. 1B illustrate a tab assembly having spacer positioned between the tab of an anode and the tab of a cathode. FIG. 1A is a sideview of the tab assembly. The spacer includes a third material in direct contact with a fourth material.

FIG. 2A through FIG. 2B illustrate a tab assembly having spacer a positioned between the tab of an anode and the tab of a cathode. FIG. 2A is a sideview of the tab assembly. The spacer includes a third material and a fourth material positioned on opposing sides of a substrate.

FIG. 3A and FIG. 3B illustrate an electrode including a tab suitable for use in a tab assembly.

FIG. 4A through FIG. 4C illustrate a pouch cell that employs an electrode constructed according to FIG. 3A through FIG. 3B.

FIG. 5A and FIG. 5B illustrate an electrochemical device assembly having a plurality of pouch cells connected in series. FIG. 5A is a sideview of the electrochemical device assembly. Tab assemblies constructed according to FIG. 1A through FIG. 1B provide the electrical connections between adjacent pouch cells.

DESCRIPTION

An electrochemical device such as a battery or capacitor has an anode in electrical communication with a tab constructed of a first material and a cathode in electrical communication with a tab constructed of a second material. A spacer is positioned between the tab of the anode and a tab of the cathode. The spacer includes a third material positioned adjacent to the first material of the anode tab and the spacer also includes a fourth material positioned adjacent to second material of the cathode tab. The third material can have a melting point that is close to the melting point of the first material and the fourth material can have a melting point that is close to the melting point of the second material. For instance, the third material can be the same as the first material and the fourth material can be the same as the second material. As a result, the tab of the anode and the tab of the cathode can both be easily welded to the spacer providing a strong connection between each of the tabs and the spacer. The strong connection between the tabs and the spacer results in a strong connection between the tabs of the anodes and the tabs of the cathode.

The third material can be clad on the spacer and/or the fourth material can be clad on the spacer. For instance, the third material can be clad directly onto the fourth material and/or the fourth material can be clad directly onto the third material. Alternately, the third and/or fourth materials can be clad on a substrate. The ability to clad the third material and/or the fourth material on the spacer may be advantageous because it does not require welding of different materials on the spacer.

Figure 1A:
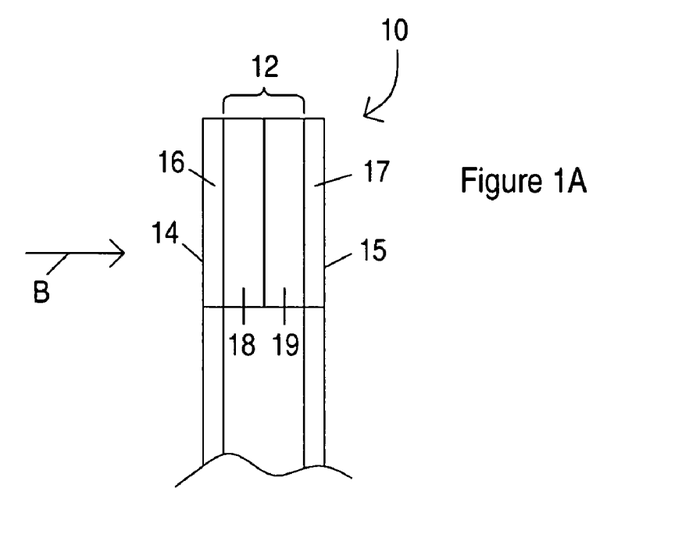
Figure 1B:
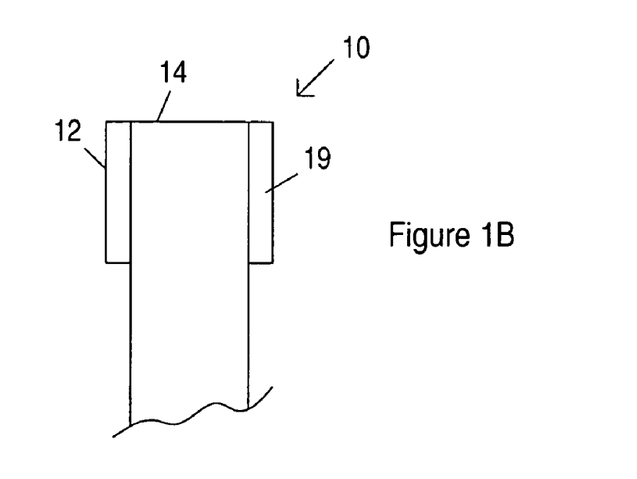
FIG. 1B is a sideview of the tab assembly shown in FIG. 1A looking in the direction of the arrow labeled B in FIG. 1A.

FIG. 1A through FIG. 1B illustrate a tab assembly. FIG. 1A is a sideview of the tab assembly 10. FIG. 1B is a sideview of the tab assembly 10 shown in FIG. 1A looking in the direction of the arrow labeled B in FIG. 1A. The tab assembly 10 includes a spacer 12 positioned between an anode tab 14 and a cathode tab 15. The anode tab 14 is in electrical communication with an anode (not shown) and the cathode tab 15 is in electrical communication with a cathode (not shown). The portion of the anode tab 14 adjacent to the spacer 12 is constructed of a first material 16 and the portion of the cathode tab 15 adjacent to the spacer 12 is constructed of a second material 17. The first material 16 can be different from the second material 17. In some instances, the anode tab 14 is constructed of the first material 16 and the cathode tab 15 is constructed of the second material 17. The portion of the spacer 12 positioned adjacent to the anode tab 14 is constructed of a third material 18 and the portion of the spacer 12 positioned adjacent to the anode tab 14 is constructed of a fourth material 19. Although FIG. 1B illustrates the spacer 12 extending beyond the edges of the anode tab 14 and the cathode tab 15, the spacer 12 need not extend beyond the edge of the anode tab 14 and/or the edge of the cathode tab 15.

In some instances, the melting point of the third material 18 is preferably within the melting point of the first material 16 plus or minus 5% or within the melting point of the first material 16 plus or minus 10%, or plus or minus 20%. In some instances, the melting point of the fourth material 19 is preferably within the melting point of the second material 17 plus or minus 5%, or within the melting point of the second material 17 plus or minus 10%, or within the melting point of the second material 17 plus or minus 20%. In some instances, the third material 18 is the same as the first material 16 and/or the fourth material 19 is the same as the second material 17. In one example, the anode tab 14 is nickel, the third material 18 is nickel, the cathode tab 15 is aluminum and the fourth material 19 is aluminum.

Figure 2A:
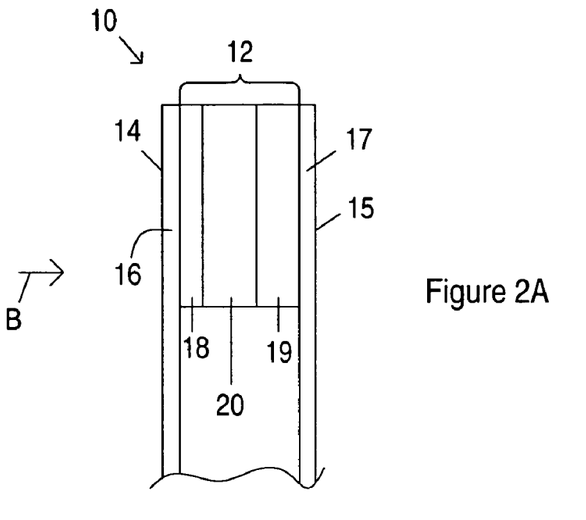
Figure 2B:
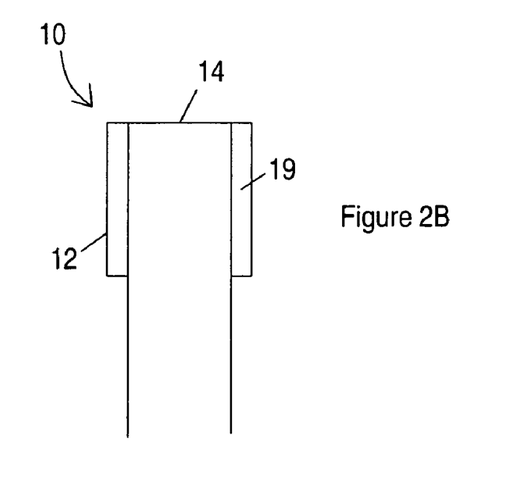
FIG. 2B is a sideview of the tab assembly shown in FIG. 2A looking in the direction of the arrow labeled B in FIG. 2A.

The third material 18 and the fourth material 19 can be positioned on a substrate 20. FIG. 2A through FIG. 2B illustrate a tab assembly 10 having a spacer 12 positioned between the tab of an anode and the tab of a cathode. FIG. 2A is a sideview of the tab assembly 10. FIG. 2B is a sideview of the tab assembly 10 shown in FIG. 2A looking in the direction of the arrow labeled B in FIG. 2A. The tab assembly 10 includes a spacer 12 positioned between an anode tab 14 and a cathode tab 15. The anode tab 14 is in electrical communication with an anode (not shown) and the cathode tab 15 is in electrical communication with a cathode (not shown). The portion of the anode tab 14 adjacent to the spacer 12 is constructed of a first material 16 and the portion of the cathode tab 15 adjacent to the spacer 12 is constructed of a second material 17. The portion of the spacer 12 positioned adjacent to the first material 16 is constructed of a third material 18 and the portion of the spacer 12 positioned adjacent to the second material 17 is constructed of a fourth material 19. Although FIG. 1B illustrates the spacer 12 extending beyond the edges of the anode tab 14 and the cathode tab 15, the spacer 12 need not extend beyond the edge of the anode tab 14 and/or the edge of the cathode tab 15.

The spacer 12 includes a substrate 20 positioned between the third material 18 and the fourth material 19. The third material 18 can cover an entire face of the substrate 20 or can cover only a portion of the substrate face. Additionally, the fourth material 19 can cover an entire face of the substrate 20 or can cover only a portion of the substrate face. Although the substrate 20 is illustrated as a single layer of material, the substrate 20 can include multiple layers of material.

The third material 18 and/or the fourth material 19 can be clad on the spacer 12. For instance, the third material 18 can be clad directly onto the fourth material 19 and/or the fourth material 19 can be clad directly onto the third material 18. Alternately, the third and/or fourth materials 19 can be clad on the substrate 20. Metal cladding processes can form a metallurgical bond between the cladding and the base metal. Metal cladding processes are distinguishable from other metal bonding processes because they rely on elevated pressure to cause diffusion of the metals into one another. As a result, there is little or no melting of the metals in contrast with other metal bonding techniques such as welding. Additionally, metal cladding processes permit forming metal-to-metal bonds over large areas. As a result cladding processes are often suitable for bonding together the faces of metal strips or sheets. The above features allow the bond resulting from cladding processes to be distinguished from the bond formed by other processes. Suitable substrates include, but are not limited to, Ni, Stainless Steel, Ti and Cu.

Suitable first materials 16 include, but are not limited to, Ni, Al, Stainless Steel, and combinations thereof. Suitable second materials 17 include, but are not limited to, Cu, Ti, Stainless Steel, and combinations thereof. Suitable third materials 18 include, but are not limited to, Ni, Al, Stainless Steel, and combinations thereof. Suitable fourth materials 19 include, but are not limited to, Cu, Ti, Stainless Steel, and combinations thereof. Suitable materials for the substrate 20 include electrically conducting materials onto which the third material and the fourth material can be clad.

Figure 3A:
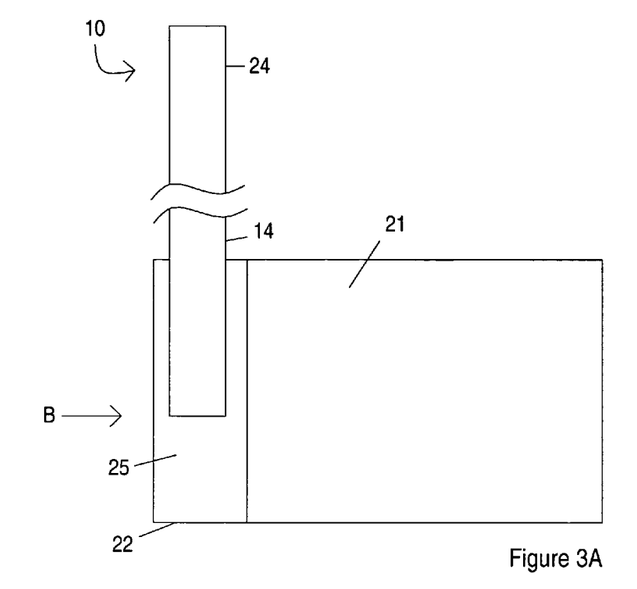
FIG. 3A is a side view of an electrode including a tab.
Figure 3B:
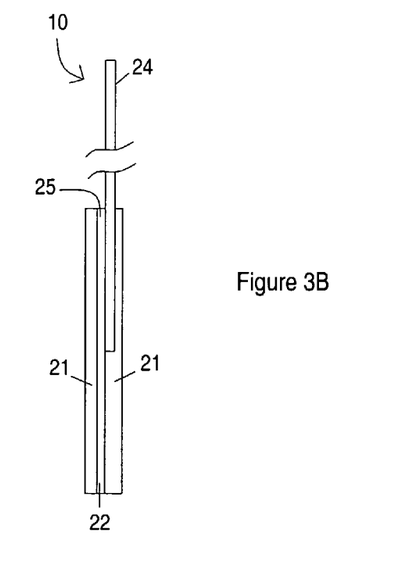
FIG. 3B is a sideview of the electrode shown in FIG. 3A taken looking in the direction of the arrow labeled B in FIG. 3A.
Figure 3C:
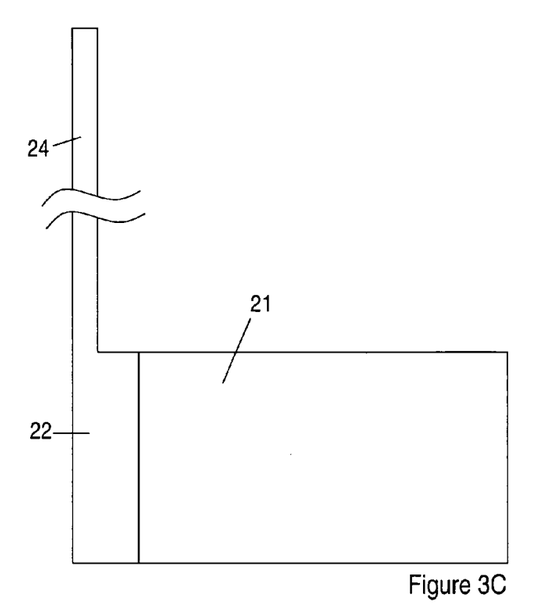
FIG. 3C is a sideview of an electrode having a substrate that is integral with a tab.

FIG. 3A through FIG. 3C illustrate the construction of electrodes that include a tab suitable for use in a tab assembly 10 according to FIG. 1A through FIG. 2B. FIG. 3A is a side view of an electrode. FIG. 3B is a sideview of the electrode shown in FIG. 3A taken looking in the direction of the arrow labeled B in FIG. 3A. The electrode can be an anode or a cathode. The electrode includes an active material 21 positioned on a substrate body 22. Suitable materials for the substrate body 22 includes, but are not limited to, Ni, Al, and Stainless Steel particularly 30 series Stainless Steel. A tab 24 is connected to an exposed portion of the substrate body 22 that serves as the electrode tab. The material for the substrate body 22 can be the same or different from the material for the tab 24. Although the active material 21 is shown on both sides of the substrate body 22, the active material 21 can be positioned on only one side of the substrate body 22. The tab 24 can serve as a battery terminal or can be in electrical communication with a battery terminal.

Although FIG. 3A and FIG. 3B illustrate the tab 24 connected to the substrate body 22, the tab 24 can be integral with the substrate body 22 as illustrated in FIG. 3C.

An electrochemical device can include anodes and/or cathodes constructed according to FIG. 3A through FIG. 3C. Accordingly, the tab 24 illustrated in FIG. 3A through FIG. 3C can serve as the anode tab 14 or the cathode tab 15 of FIG. 1A through FIG. 2B. Since the redox conditions at the anode and cathode are different, the tab may be constructed of different materials for anodes than for cathodes. For instance, the tab can be constructed of Ni, Cu, Ti, and/or Stainless Steel for an anode and Al, Ni, and/or Stainless Steel for a cathode. Additionally or alternatively, the substrate body may be constructed of different materials when the electrode is an anode than when it is a cathode. For instance, the substrate body can be constructed of Ni, Cu, and/or Ti for an anode and Al, Ni, and/or Stainless Steel for a cathode.

In some instances, the substrate body 22 also serves as the active material 21 are the same. For instance, the substrate body 22 can be lithium metal which can also serve as the active material 21. As a result, the electrode need not include a separate active material 21 on the substrate body 22.

Figure 4A:
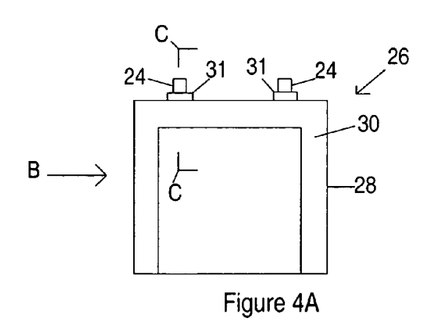
FIG. 4A is a sideview of the pouch cell.
Figure 4B:
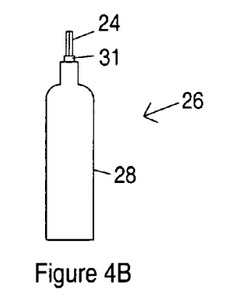
FIG. 4B is a side view of the pouch cell shown in FIG. 4A taken looking in the direction of the arrow labeled B.
Figure 4C:
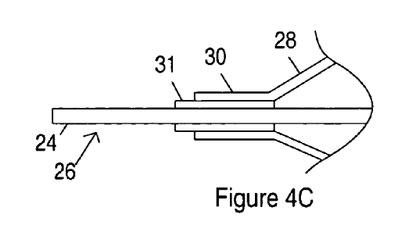
FIG. 4C is a cross section of the pouch cell shown in FIG. 4A taken looking along a line extending between the brackets labeled C and in the direction of the arrow labeled B in FIG. 4A.

Electrodes that include the tab assembly 10 can be employed in conjunction with a variety of battery constructions. For instance, the electrode can be employed in a pouch cell or a pouch battery. FIG. 4A is a sideview of a pouch cell 26. FIG. 4B is a side view of the pouch cell 26 shown in FIG. 4A taken looking in the direction of the arrow labeled B. FIG. 4C is a cross section of the pouch cell 26 shown in FIG. 4A taken looking along a line extending between the brackets labeled C and in the direction of the arrow labeled B in FIG. 4A. The pouch cell 26 includes one or more anodes and one or more cathodes positioned in a pouch 28 which serves as the battery casing. Suitable materials for the pouch include, but are not limited to, aluminum. Although not illustrated, a separator is positioned between pairs of anodes and cathodes that are adjacent to one another in the pouch. The pouch can be formed from a flap of material with a sealed region 30 at the perimeter. A plurality of tabs extend through the sealed region 30. One of the tabs is in electrical communication with one or more anodes in the pouch and another of the tabs is in electrical communication with one or more cathodes in the pouch. A sealing medium 31 can be positioned in the sealed region 30 such that the sealing medium seals the regions of the pouch adjacent to the tabs. The sealing medium 31 can be positioned on the tab before the sealed region is sealed. For instance, the sealing medium 31 can be formed on the tab by heat sealing, by casting a material such as polypropylene, or by positioning adhesive agents such as glues or epoxies in the desired location.

Figure 4D:
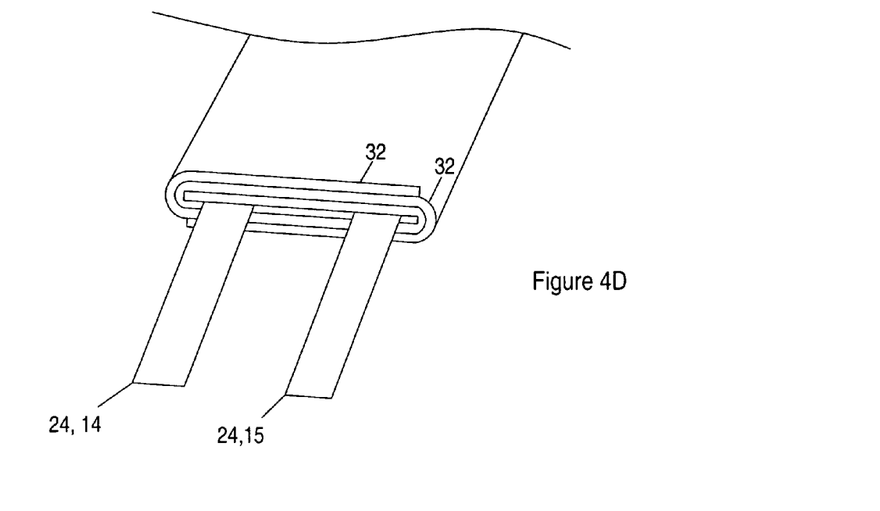
FIG. 4D illustrates a wound arrangement of electrodes suitable for use in a pouch cell.

The electrodes can be stacked or wound in the pouch. For instance, FIG. 4D illustrates a wound arrangement of the electrodes 32 suitable for use in the pouch cell 26 of FIG. 4A through FIG. 4C. One of the electrodes 32 serves as an anode and one of the electrodes serves as a cathode. A different tab is in electrical communication with each of the electrodes. Although not illustrated, a separator is positioned between the anode and the cathode. Although only two electrodes 32 are illustrated in the wound arrangement, more than two electrodes 32 can be wound together.

Figure 4E:
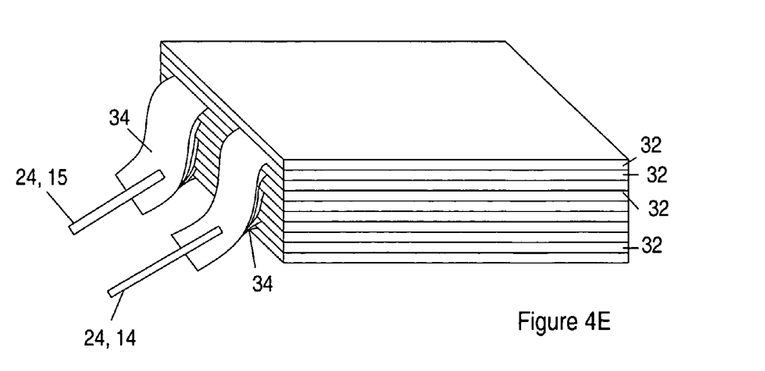
FIG. 4E illustrates a stacked arrangement of electrodes suitable for use in a pouch cell.

FIG. 4E illustrates a stacked arrangement of the electrodes 32 suitable for use in the pouch cell 26 of FIG. 4A through FIG. 4C. In the stack, anodes are alternated with cathodes. Although not illustrated, a separator is positioned between adjacent anodes and cathodes. The electrodes 32 each include an electrode tab 34 that extends outward from the substrate body 22. The electrode tabs 34 are in electrical communication with one another and with a tab. Accordingly, a different tab is in electrical communication with the anodes than is in electrical communication with the cathodes. The stack can include only two electrodes 32.

Figure 5A:
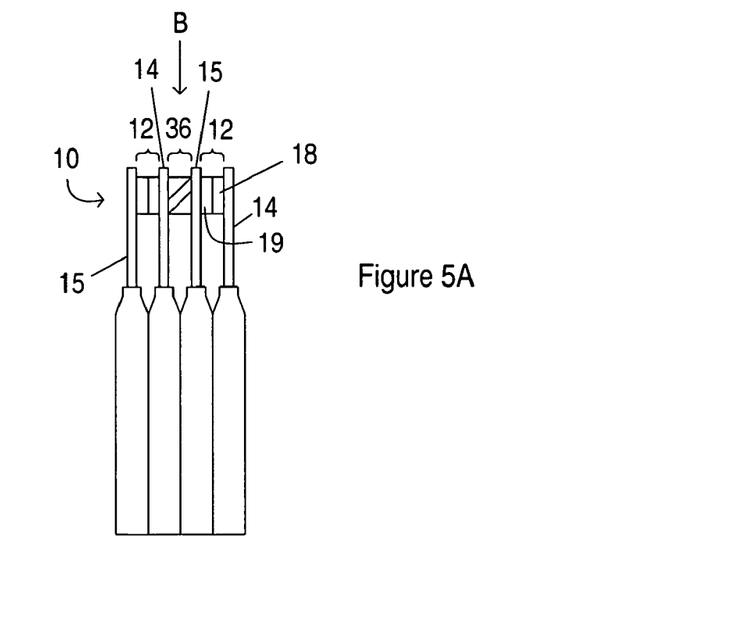
Figure 5B:
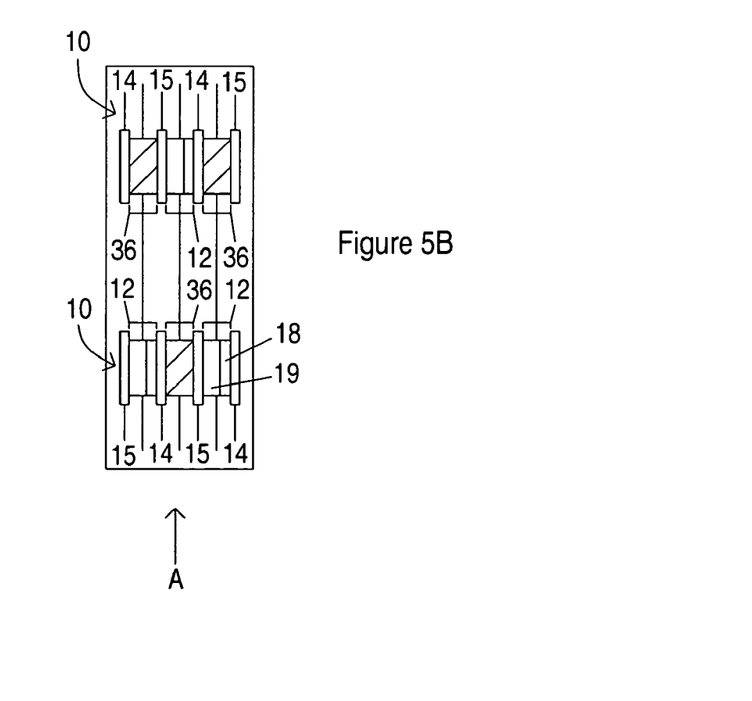
FIG. 5B is a sideview of the electrochemical device assembly shown in FIG. 5A taken looking in the direction of the arrow labeled B in FIG. 5A.

FIG. 5A and FIG. 5B illustrate an electrochemical device assembly having a plurality of pouch cells connected in series. FIG. 5A is a sideview of the pouch cells and FIG. 5B is a sideview of the pouch cells shown in FIG. 5A taken looking in the direction of the arrow labeled B in FIG. 5A. The pouch cells include tab assemblies 10 constructed according to FIG. 1A through FIG. 2B. The anodes and cathodes are alternated so spacers 12 are positioned between adjacent anode tabs 14 and cathode tabs 15. The anode tabs 14 and the cathode tabs 15 are constructed of different materials. For instance, the anodes tabs can be nickel and the cathode tabs 15 can be aluminum. The spacers 12 are constructed of a third material 18 clad on a fourth material 19 or of a third material 18 clad on a fourth material 19. For instance, the spacer 12 can be constructed of nickel clad on aluminum. The third material 18 of the spacer 12 is connected to the first material 16 on the anode tab 14. The fourth material 19 on the spacer 12 is connected to the second material 17 on the cathode tab 15. The electrochemical device assembly can optionally include insulating spacers 36 positioned between one or more pairs of adjacent anode tabs 14 and cathode tabs 15. Each insulating spacers 36 is configured so as to prevent current flow through the spacer.

Pouch cells can be used in a variety of different applications. A suitable application for the pouch cells is illustrated in U.S. patent application Ser. No. 11/269,285, filed on Nov. 8, 2005, entitled "Modular Battery Pack," and incorporated herein in its entirety. U.S. patent application Ser. No. 11/269,285 discloses pouch cells connected in series. The electrically conducting spacers disclosed in U.S. patent application Ser. No. 11/269,285 can be the clad spacers disclosed herein. Additionally, the pouch cell construction disclosed herein can be employed as the pouch cells disclosed in U.S. patent application Ser. No. 11/269,285 with the anode tabs being constructed of a different material than the cathode tabs 15. Accordingly, the serial connections between the pouch cells of U.S. patent application Ser. No. 11/269,285 can be made as disclosed herein.

Figure 6A:
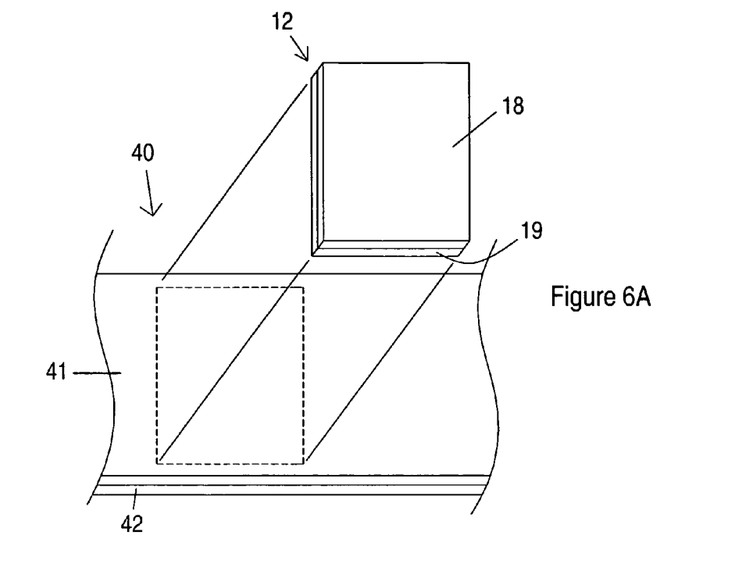
FIG. 6A and FIG. 6B each illustrate a method of forming a spacer for use in an electrochemical device assembly.
Figure 6B:
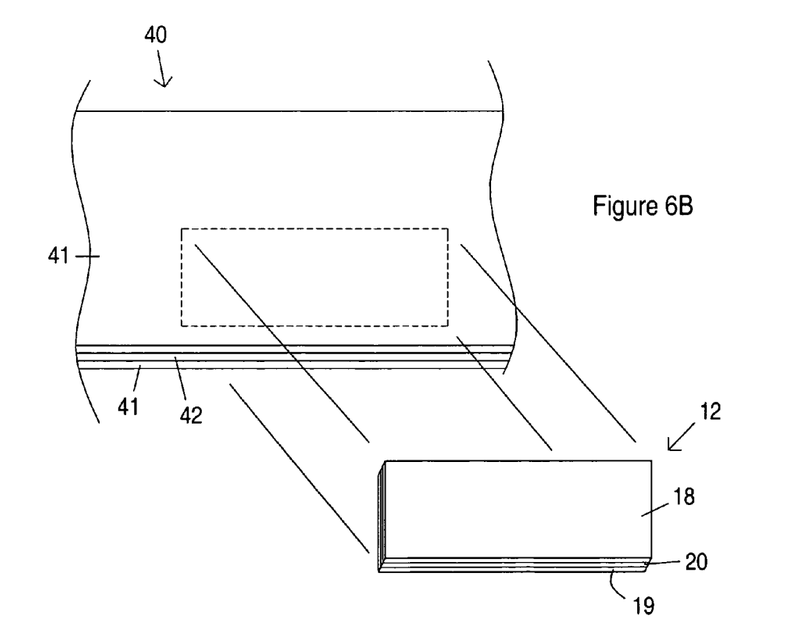

FIG. 6A and FIG. 6B illustrate a method of forming a spacer for use in an electrochemical device assembly. FIG. 6A illustrates a method of forming a clad spacer 12 according to FIG. 1A through FIG. 1B. The spacer can be formed by causing a metal sheet 40 to be generated such that the metal sheet includes a cladding on a base metal 42 as shown in FIG. 6A. The cladding will become the third material 18 on the spacer and the base metal will become the fourth material 19 on the spacer. Alternately, the cladding will become the fourth material 19 on the spacer and the base metal will become the third material 18 on the spacer. The metal sheet 40 can have a variety of different shapes including, but not limited to, a strip shape, square, rectangular, round or oval.

A metal cladding process is employed to form the cladding on the base metal 42. Metal cladding processes can form a metallurgical bond between the cladding and the base metal 42. Metal cladding processes are distinguishable from other metal bonding processes because they rely on elevated pressure to cause diffusion of the metals into one another. As a result, there is little or no melting of the metals in contrast with other metal bonding techniques such as welding. Additionally, metal cladding processes permit forming metal-to-metal bonds over large areas. As a result cladding processes are often suitable for bonding together the faces of metal strips or sheets. The above features allow the bond resulting from cladding processes to be distinguished from the bond formed by other processes.

There are different methods for forming clad metals, such as aluminum clad with stainless steel. In one method, the cladding metal is fed onto the metal sheet 40 in contact with the base metal 42 and the result is then passed to a hot roll bonding system. Another method produces a clad metal by forming and fixing a powder that includes or consists of the cladding on the base metal 42 without heat, melting and solidifying only the surface and a subsurface area of the layer of the metal powder in a vacuum, and subjecting the material to hot isostatic pressing. Explosion bonding is another example of a method that is suitable for cladding thick layers of material. Suitable technologies for forming a cladding according to FIG. 5A are available from TMI (Technical Materials, Inc. of Lincoln, R.I.), Mitanishoji of Japan, and Cladmetals, LLC.

The spacer 12 is extracted from the metal sheet 40 along the dashed lines illustrated in FIG. 6A. For instance, the spacer can be stamped or punched from the metal sheet 40. The sealing medium 16 can be formed on the tab 14 by heat sealing, by casting a material such as polypropylene, or by positioning adhesive agents such as glues r epoxies in the desired location. The tab 14 can be connected to a substrate body 22 before or after placement of the sealing medium 16 on the tab 14.

The method illustrated in FIG. 6A can be adapted to form a spacer 12 such as the spacer illustrated in FIG. 2A through FIG. 2B. For instance, the sheet of metal can include a first cladding on one side of a substrate and a second cladding on a second side of the substrate as illustrated in FIG. 6B. The first cladding will become the third material 18 on the spacer, the substrate will become the substrate for the spacer, and the second cladding will become the fourth material 19 on the spacer. The sheet of metal can be generated employing the same cladding techniques described above. The spacer 12 can extracted from the metal sheet 40 along the dashed lines illustrated in FIG. 6B.

The anode tab and the cathode tab 15 can be attached to the spacer 12 by a variety of different techniques including welding. For instance, a first weld can be employed to connect the first material 16 of the anode tab to the third material 18 of the spacer 12 and a second weld can be employed to connect the second material 17 of the anode tab to the fourth material 19 of the spacer 12. The first weld can be a different type of weld than second weld. For instance, the first weld can be a resistance weld and the second weld can be an ultrasonic weld. When the first material 16 is nickel, the first weld is preferably a resistance weld and when the second material 17 is aluminum, the second weld is preferably an ultrasonic weld. In one example, the first material 16 and the third material 18 are nickel, and the first weld is a resistance weld, and/or the second material 17 and the fourth material 19 are aluminum, and the first weld is an ultrasonic weld. When an anode tab and/or a cathode tab is independent of the substrate body, the anode tab and/or a cathode tab can be connected to the substrate body of an electrode before or after being connected to the spacer. The anode tab and/or a cathode tab can be often connected to the substrate body using a weld such as an ultrasonic weld or a laser weld.

Many of the illustrations and discussions above are disclosed using the spacer 12 disclosed in FIG. 1A and FIG. 1B, however, the illustrations and discussions can employ the spacer 12 of FIG. 2A through FIG. 2B. For instance, the electrochemical device assembly illustrated in FIG. 5A and FIG. 5B can employ the spacers illustrated in FIG. 2A and FIG. 2B. Additionally, the spacers disclosed above can be employed in conjunction with other tab constructions. For instance, the spacers disclosed above can be employed in conjunction with tabs having one or more clad regions as disclosed in U.S. patent application Ser. No. 11/339,920, filed on Jan. 25, 2006, entitled "Electrochemical Device Having Electrode in Communication with Clad Tab," and incorporated herein in its entirety.

Although the tab assemblies are disclosed in the context of pouch cells, the tab assemblies can be employed in conjunction with other electrochemical devices, with other cell constructions, and/or with other battery constructions. For instance, tab assemblies can be employed in conjunction with electrochemical devices such as capacitors and hybrid capacitors/batteries.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. An electrochemical device assembly, comprising:
   an anode tab having a first material, the anode tab being in electrical communication with one or more anodes;
   a spacer having a third material and a fourth material, the fourth material being different from the third material, the spacer being connected to the anode tab such that the third material of the spacer is connected to the first material of the anode tab;
   a cathode tab having a second material, the cathode tab being in electrical communication with one or more cathodes, the spacer being connected to the cathode tab such that the second material of the cathode tab is connected to the fourth material of the spacer,
   the anode tab being in electrical communication with the cathode tab through the spacer; and
   wherein the third material is clad directly on the fourth material such that the third material is bonded to the fourth material with a bond that is in accordance with a bond formed by a metal cladding process that relies on elevated pressure to cause diffusion of the third material and the fourth material into one another, or
   the fourth material is clad directly on the third material such that the fourth material is bonded to the third material with a bond that is in accordance with a bond formed by a metal cladding process that relies on elevated pressure to cause diffusion of the third material and the fourth material into one another.

2. An electrochemical device assembly, comprising:
   an anode tab having a first material, the anode tab being in electrical communication with one or more anodes;
   a spacer having a third material and a fourth material, the fourth material being different from the third material, the spacer being connected to the anode tab such that the third material of the spacer is connected to the first material of the anode tab;
   a cathode tab having a second material, the cathode tab being in electrical communication with one or more cathodes, the spacer being connected to the cathode tab such that the second material of the cathode tab is connected to the fourth material of the spacer, the anode tab being in electrical communication with the cathode tab through the spacer; and     wherein the third material is clad on a substrate such that the third material is bonded to the substrate with a bond that is in accordance with a bond formed by a metal cladding process that relies on elevated pressure to cause diffusion of the third material and the substrate into one another,     and/or the fourth material is clad on the substrate such that the fourth material is bonded to the substrate with a bond that is in accordance with a bond formed by a metal cladding process that relies on elevated pressure to cause diffusion of the third material and the substrate into one another.

3. A method of generating a electrochemical device, comprising:

causing an electrically conducting spacer to be generated by cladding a third material on a fourth material such that the third material is bonded to the fourth material with a bond that is in accordance with a bond formed by a metal cladding process that relies on elevated pressure to cause diffusion of the third material and the fourth material into one another, or by cladding the fourth material on the third material such that the fourth material is bonded to the third material with a bond that is in accordance with a bond formed by a metal cladding process that relies on elevated pressure to cause diffusion of the third material and the fourth material into one another;

connecting an anode tab to the spacer such that a third material included in the spacer is connected to a first material included the anode tab, the anode tab configured to be in electrical communication with one or more anodes;

connecting a cathode tab to the spacer, such that a fourth material included in the spacer is connected to a second material included the cathode tab, the fourth material being different from the third material, the first material being different from the second material and the cathode tab configured to be in electrical communication with one or more cathodes; and     the anode tab and the cathode tab being connected to the spacer such that the anode tab is in electrical communication with the cathode tab through the spacer after the cathode tab and the anode tab are connected to the spacer.

4. A method of generating a electrochemical device, comprising:

causing an electrically conducting spacer that includes a third material and a fourth material that is different from the fourth material to be generated by cladding the third material on a substrate such that the third material is bonded to the substrate with a bond that is in accordance with a bond formed by a metal cladding process that relies on elevated pressure to cause diffusion of the third material and the substrate into one another,     and/or by cladding the fourth material on the substrate such that the fourth material is bonded to the substrate with a bond that is in accordance with a bond formed by a metal cladding process that relies on elevated pressure to cause diffusion of the third material and the substrate into one another     connecting an anode tab to the spacer such that the third material is connected to a first material included the anode tab, the anode tab configured to be in electrical communication with one or more anodes;

connecting a cathode tab to the spacer such that the fourth material is connected to a second material included the cathode tab, the first material being different from the second material and the cathode tab configured to be in electrical communication with one or more cathodes; and     the anode tab and the cathode tab being connected to the spacer such that the anode tab is in electrical communication with the cathode tab through the spacer after the cathode tab and the anode tab are connected to the spacer.

\* \* \* \* \*